United States Patent Office 2,815,375
Patented Dec. 3, 1957

2,815,375

PROCESS FOR THE MANUFACTURE OF SEBACIC ACID

Jonas Kamlet, New York, N. Y., assignor to Crown Zellerbach Corporation, San Francisco, Calif., a corporation of Nevada No Drawing. Application November 30, 1955,
Serial No. 550,202

7 Claims. (Cl. 260—537)

This invention relates to a new process for the manufacture of sebacic acid. More particularly, it relates to an improved process whereby sebacic acid may be synthesized from inexpensive and readily available raw materials, i. e. furfural and levulinic acid.

Sebacic acid has heretofore been manufactured industrially almost exclusively by the reaction of castor oil, or derivatives thereof, with caustic alkalies, either in fusions, or in aqueous solutions at advanced temperatures and pressures. (Hargreaves and Owen, Jour. Chem. Soc. 1947, 753; Boedtker, Berichte 1924, 478; American Cyanamid Co., British Patent 534,322; Societe Organico, British Patent 675,434; Henkel & Cie., British Patent 698,154; Dupont & Kostelitz, U. S. Patent 2,674,608; Stein, U. S. Patents 2,696,500–501; Lane, U. S. Patent 2,580,931; Bruson & Covert, U. S. Patent 2,182,056; Verma & Aggarwal, Journ. Sc. Ind. Research VIII B, #10, 183–4; Subba Rao & Rao, Paint India III, 7 and 8; Dominguez, Speron & Slim, Journ. Chem. Education 29, 446–8 (1952); Revue des Produits Chemiques, April 1952, 103–108, Jones, Chimia, 8, 169–173 (1951); Houpt, U. S. Patent 2,217,515.)

It is the purpose of this invention to provide a process whereby sebacic acid may be prepared from furfural (which is obtainable from a number of inexpensive and readily available pentosan-containing waste products, such as cereal straws, brans, corncobs, oat hulls, sulfite waste liquors, wood waste, etc.) and levulinic acid (which is obtainable by the reaction of carbohydrates, such as starch, sucrose, molasses, glucose, cellulose polysaccharides, sawdust, wood flour, etc., with acids at advanced temperatures and pressures).

Sebacic acid is an important industrial chemical extensively employed as an intermediate in the manufacture of plasticizers, synthetic resins of the alkyd and polyester type, synthetic elastomers of the polyester-polyurethane type, fibers, filaments and films of the linear polyamide type and a variety of other products.

The basis of my invention is the finding that sebacic acid can be prepared in good yield by the reaction of a salt of 4,7-diketodecan-1,10-dioic acid (4,7-diketosebacic acid) in aqueous solution with hydrogen, in the presence of a hydrogenation catalyst, at a temperature between 200° C. and 300° C. (and preferably between 240° C. and 280° C.), and thereafter acidifying the solution of the resultant salt of sebacic acid, and separating the precipitated sebacic acid.

The reaction is effected by the hydrogenation of a member of the group consisting of the ammonium, alkali metal and alkali-earth metal salts of 4,7-diketodecan-1,10-dioic acid in aqueous media. The preferred salt is the di-sodium salt of 4,7-diketodecan-1,10-dioic acid.

The hydrogenation is effected in the presence of a hydrogenation catalyst chosen from the group consisting of precipitated nickel, nickel salts deposited on kieselguhr, pumice or asbestos and reduced to the active catalytic metal by hydrogenation, Raney nickel, Raney cobalt, the "W" modifications (Adkins) of the Raney nickel and cobalt catalysts, "promoted" Raney nickel catalysts (e. g. with small amounts of platinum chloride, triethylamine, etc.), nickel prepared by the reductions of nickel formate or nickel oxalate, copper chromite, zinc chromite, nickel-copper-chromium catalysts, et cetera. Preferred catalysts, on the basis of cost, effectiveness, ease of recovery and length of effective life, are Raney nickel, Raney cobalt and promoted copper chromite catalysts.

The hydrogenation is effected at hydrogen pressures between 50 and 200 atmospheres. This is by no means a critical range, since the hydrogen pressure may vary widely with equally satisfactory results being obtained. The temperature at which the hydrogenation is effected is, however, critical in this invention.

Urban, in U. S. Patent 2,688,621 (1954) has shown that the hydrogenation of 4,7-diketodecan-1,10-dioic acid in the presence of a catalyst consisting of palladium dispersed on alumina or Raney nickel at temperatures between 125° C. and 160° C., and at hydrogen pressures between 50 and 150 atmospheres, gives exclusively the bis-lactone of 4,7-dihydroxysebacic acid.

It was therefore surprising to find that the effecting of the hydrogenation of the water-soluble salts of 4,7-diketodecan-1,10-dioic acid, in the presence of at least one of the catalysts above enumerated, at a higher temperature range than that described in the Urban patent, i. e. at temperatures between 200° C. and 300° C., and preferably between 240° C. and 280° C., effects the reduction of the salt of 4,7-diketodecan-1,10-dioic acid smoothly and in good yield to the corresponding salt of sebacic acid, e. g.

$$NaOOCCH_2CH_2COCH_2CH_2COCH_2CH_2COONa + 4H_2 \rightarrow$$
$$NaOOCCH_2CH_2CH_2CH_2CH_2CH_2CH_2CH_2COONa +$$
$$2H_2O$$

After separating the catalyst (which may be returned to the process for re-use in the hydrogenation of succeeding batches), the solution of the salt of sebacic acid may be acidified (e. g. with hydrochloric, sulfuric, phosphoric, acetic, oxalic acid, etc.) and the precipitate of insoluble sebacic acid filtered or centrifuged off, washed and dried. This behavior is unexpected, since it has not previously been shown that the nature of the product obtained by such hydrogenations can be completely different when a higher temperature range is employed. At temperatures up to 200° C., the 4,7-diketodecan-1,10-dioic salt is hydrogenated to the bis-lactone of 4,7-dihydroxysebacic acid. At temperatures between 200° C. and 300° C., the 4,7-diketodecan-1,10-dioic salt is hydrogenated smoothly to the corresponding sebacic acid salt.

The hydrogenation step of this process is effected in the manner and with the equipment well known to the art, i. e. in a batchwise, continuous or semi-continuous basis, in autoclaves, tubular reactors, bombs or similar pressure equipment, preferably arranged for agitation or turbulent flow to effect uniform distribution of the catalyst throughout the reaction mixture. Duration of the hydrogenation may vary over wide ranges depending on the size of the batch, design and operation of the equipment, et cetera. Reaction periods or residence times within the hydrogenation vessel (in the case of continuous operation of a tubular autoclave or similar equipment) may vary from two to twenty-four hours, depending on the size of the batch being hydrogenated.

The starting material for this process is 4,7-diketodecan-1,10-dioic acid may be prepared by the condensation of furfural and levulinic acid, in the presence of an alkaline catalyst (such as soda ash or caustic soda) in aqueous media, to form the resultant alkali metal salt of delta-furfurylidine levulinic acid, which is then acidified to recover the free acid, which is then treated in alcoholic acid solution to open and hydrate the furane ring to form the 4,7-diketodecan-1,10-dioic acid, according to the methods described by Ludwig and Kehrer (Berichte 24, 2776 (1891)), Asahina and Fuyita (Journ. Pharm. Soc. Japan 448, 471 (1929)) and Hachihama and Hayashi (Makromol Chemie, 13, 201 (1954)). The reactions involved are:

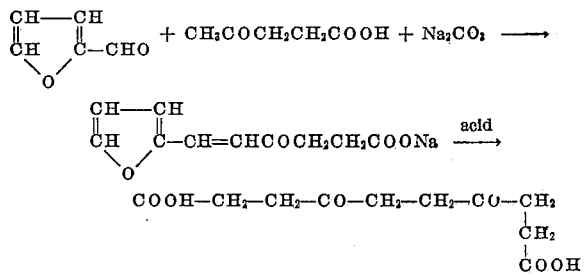

The following example may be given to define and to illustrate this invention but in no way to limit it to reagents, proportions or conditions described therein. Obvious modification will occur to any person skilled in the art.

*Example*

A mixture of 96 gms. of furfural (1 mole) and 200 cc. of 95% ethanol is added dropwise to a solution of 235 gms. of levulinic acid (2 moles) and 300 gms. of soda ash (2.83 moles) in 1200 cc. of water over a period of two hours while maintaining the temperature between 90° C. and 95° C., and the reaction mixture is then refluxed for an additional one hour. The mixture is then cooled and acidified with 600 cc. of 22° Bé hydrochloric acid. The precipitate of delta-furfurylidenelevulinic acid (with some resinous material) is filtered off. From the filtrate, the ethanol solvent and 152 gms. of unreacted levulinic acid may be recovered for re-use.

The crude delta-furfurylidenelevulinic acid is mixed with 410 gms. of 22° Bé hydrochloric acid and 850 cc. of 95% ethanol and the mixture is refluxed for 11 hours. The reaction mixture is then filtered and the filtrate is distilled to separate the acid and the alcohol, which may be re-used. The residue is recrystallized from boiling water to yield 108 gms. of 4,7-diketodecan-1,10-dioic acid, M. P. 155°–157° C.

231 gms. of 4,7-diketodecan-1,10-dioic acid (1 mole) is dissolved in 2400 cc. of 5% aqueous soda ash solution and 50 gms. of activated Raney nickel catalyst is added. The mixture is then hydrogenated, with good agitation, at a temperature of 250° C.–260° C., at a hydrogen pressure of 150 atmospheres, for 12 hours, or until no further hydrogen uptake occurs. The reaction mixture is then cooled, the catalyst is filtered off and may be recovered for re-use, and the filtrate is acidified with 250 cc. of 22° Bé hydrochloric acid. On cooling, and standing overnight, the precipitate of sebacic acid is filtered off, washed and dried. The yield of sebacic acid, M. P. 131° C.–133° C., is 172 gms., equivalent to 85% of theoretical.

Having described my invention, what I claim and desire to protect by Letters Patent is:

1. A process for the manufacture of sebacic acid which comprises hydrogenating a member of the group consisting of the alkali metal, alkali-earth metal and ammonium salts of 4,7-diketodecan-1,10-dioic acid, in the presence of a hydrogenation catalyst at a hydrogen pressure between 50 and 200 atmospheres, in an aqueous medium, at a temperature between 200° C. and 300° C., thereafter acidifying the solution of the resultant salt of sebacic acid and separating the precipitated sebacic acid from the reaction medium.

2. The process of claim 1 effected at a temperature between 240° C. and 280° C.

3. The process of claim 1 wherein sodium 4,7-diketodecan-1,10-dioic acid is hydrogenated to sodium sebacate.

4. The process of claim 1 where the hydrogenation catalyst is a member of the group consisting of nickel, cobalt, copper chromite, zinc chromite and nickel-copper-chromium catalysts.

5. The process of claim 1 effected with Raney nickel catalyst.

6. The process of claim 1 effected with Raney cobalt catalyst.

7. The process of claim 1 effected with copper chromite catalyst.

References Cited in the file of this patent

UNITED STATES PATENTS

| | | |
|---|---|---|
| 2,484,486 | Caldwell | Oct. 11, 1949 |
| 2,688,621 | Urban | Sept. 7, 1954 |

OTHER REFERENCES

Wagner-Zook: Synthetic Organic Chemistry (1953), page 432.

Gilman: Organic Chemistry, vol. 1, 2nd ed. (1953), page 825.